United States Patent

[11] 3,540,506

[72] Inventor Marinus Newhouse, Jr.
 1048 N. 6th St., Redmond, Oregon 97756
[21] Appl. No. 791,471
[22] Filed Jan. 15, 1969
[45] Patented Nov. 17, 1970

[54] BALE-SHREDDING MACHINE
 12 Claims, 7 Drawing Figs.
[52] U.S. Cl. .................................................... 146/70.1,
 146/119
[51] Int. Cl. ...................................................... A10f 31/00
[50] Field of Search ........................................... 146/70.1,
 118, 119, 109, 110, 130, 117

[56] References Cited
UNITED STATES PATENTS
2,298,482 10/1942 Holland-Letz ................ 146/109
2,889,862 6/1959 Williamson ................... 146/119X Primary Examiner—W. Graydon Abercrombie
Attorney—Kolisch and Hartwell ABSTRACT: A machine for shredding baled material including a chamber into which a bale may be fed and a cutter organization in the chamber for shredding the bale. The cutter organization includes a series of cutter teeth rotatable about an axis extending across the chamber, an elongated retainer assembly for yieldably pressing against the top of the bale to hold it during shredding, and adjustment means for varying the vertical position of the retainer assembly with the retainer assembly being moved translationally vertically in the chamber. A plurality of spaced-apart fingers project outwardly from the retainer assembly to provide a first cutting grate through which the cutter teeth may pass, and a series of spaced-apart bars secured within the chamber provide a second cutting grate through which the cutter teeth may pass after passing the first grate. Multiple cutter teeth are mounted at varying axial distances from the sides of rotatable supporting disks.

Patented Nov. 17, 1970

Marinus Newhouse, Jr.
INVENTOR
BY
Kolisch + Hartwell
Attys.

Patented Nov. 17, 1970

Marinus Newhouse, Jr.
INVENTOR
BY
Kolisch + Hartwell
Attys.

BALE-SHREDDING MACHINE

This invention relates to a bale-shredding machine, and more particularly to a cutter organization within such machine.

Hay, or other like material, which is used as animal fodder is commonly baled in the fields. Frequently, during baling, solid foreign objects, such as stones, become embedded in the baled hay. It is generally desirable to shred the baled material thoroughly prior to feeding it to livestock, and shredding machines are known which will prevent damage to the machinery despite the presence of foreign objects in the baled material. Such a machine is disclosed in the copending U.S. Pat. application of Marinus Newhouse, Jr., Ser. No. 681,307, filed Oct. 26, 1967 now U.S. Pat. No. 3,509,924. That machine includes a cutter organization which has a retainer assembly which rests yieldably against the top of a bale, cutters which are rotatable about an axis to engage a face of the bale, and a cutting grate through which the cutters pass after engaging the face of the bale.

I have found that the best way of holding a bale during shredding is to have the retainer assembly rest flat against a major portion of the upper surface of the bale. Further, in order to accommodate bales of various sizes, the retainer assembly should be easily adjustable vertically while maintaining substantially the same slope relative to the top of a bale fed into the machine. Mechanism for readily performing such adjustments have not been disclosed in previous bale-shredding machines.

I have also found that while a yieldable cutting grate as disclosed in prior machines is satisfactory for accommodating the passage of foreign objects so that they may be rejected by the machine, it does not always provide the most desirable shredding of a bale. I have found that by positioning a fixed cutting grate downstream from the region in which any foreign objects are rejected by the machine better shredding is achieved. Improved shredding is further accomplished by increasing the number of cutting paths of the cutters engaging a face of the bale and passing through the cutting grates.

A general object of the invention is to provide novel adjustment means for a retainer assembly in a cutter organization of a bale-shredding machine, which adjustment means is simply operated and, upon operation, moves the retainer assembly vertically while maintaining it at substantially the same slope.

More specifically, an object of the invention is to provide such novel adjustment means which includes a movable control and linkage means interconnecting the control and opposite ends of the retainer assembly in such a manner that movement of the control in one direction causes the upstream and downstream ends of the retainer assembly to move downwardly the same distance and movement in the other direction causes the opposite ends of the retainer assembly to move upwardly the same distance.

Another object of the invention is to provide such adjustment means which includes a novel yieldable connector between the control means and the retainer assembly which is adapted to hold the retainer assembly against the top of a bale and to permit one end of the assembly to move upwardly free of the top of such bale when a predetermined pressure is applied to the assembly.

Yet another object of the invention is to provide in such cutter organization a first cutting grate through which a series of cutters may pass with the first cutting grate being permitted to move away from the cutters when a predetermined pressure is applied thereto, and a novel second cutting grate fixedly mounted in the machine downstream from the first cutting grate through which the cutters pass after passing through the first cutting grate. With this novel organization, when the first cutting grate is actuated to permit passage and rejection from the machine of a solid foreign object, the second cutting grate will insure proper shredding of the material.

Still another object is to provide a novel cutter organization in such a bale-shredding machine wherein cutter teeth are so mounted on the axially facing sides of their rotatable supports that upon rotation of a support multiple cutting paths are defined by the cutter teeth mounted on one of its sides.

These and other objects and advantages will become more fully apparent as the following description is read together with the accompanying drawings, wherein.

Figure 2:
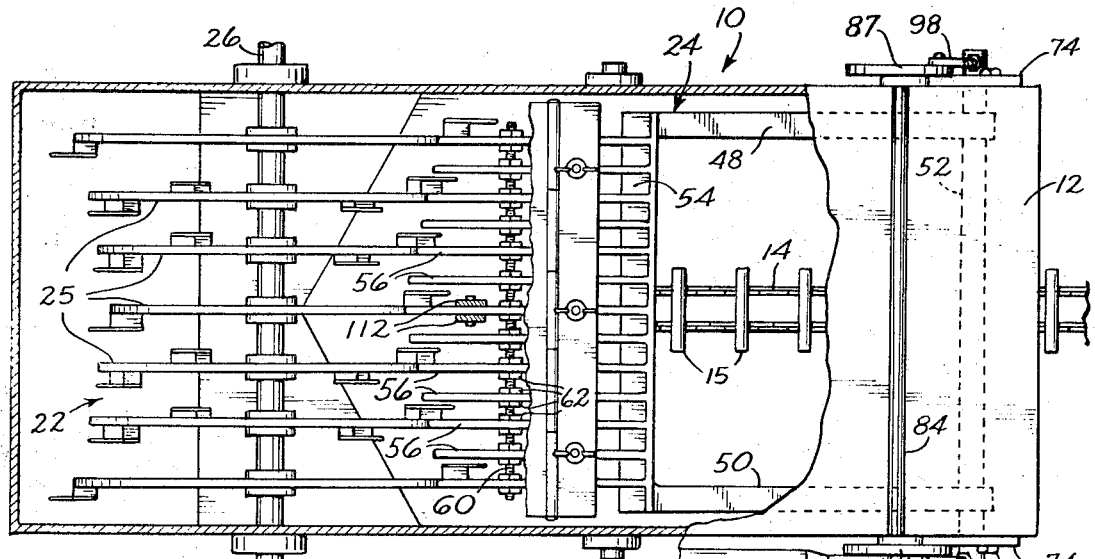
FIG. 2 is a top plan view of the machine of FIG. 1 with portions broken away.
Figure 1:
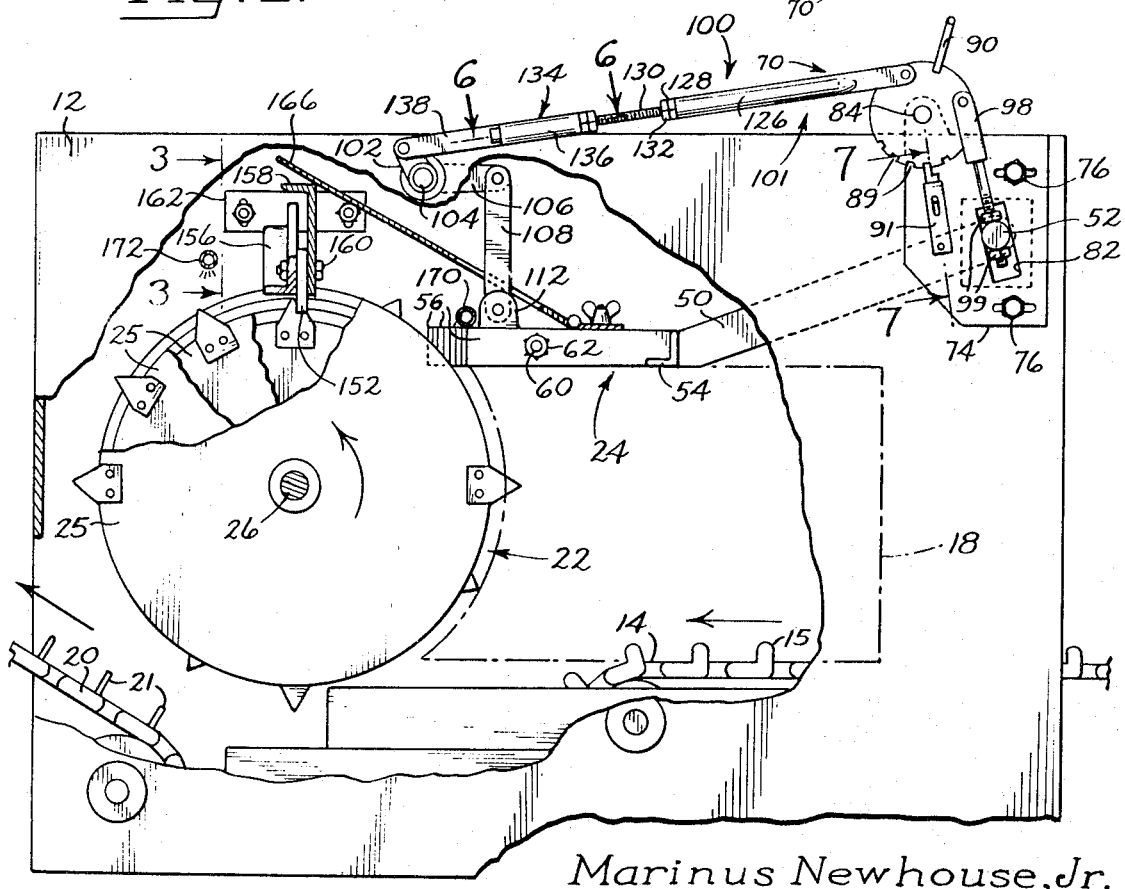
FIG. 1 is a side view of a bale-shredding machine including a cutter organization constructed in accordance with an embodiment of the invention, with a portion of the machine broken away.

Turning now to the drawings, and first more particularly to FIGS. 1 and 2, at 10 is indicated generally a bale-shredding machine. The bale-shredding machine includes a housing 12, the interior of which defines a shredding chamber. A power-driven infeed conveyor chain 14, having lugs 15 secured thereto, is adapted to carry bales of hay, or like material, such as that illustrated in phantom outline at 18, into the chamber in the direction shown by the horizontal arrow in FIG. 1. A power-driven outfeed conveyor 20, having paddles 21 secured thereto, is driven in the direction of the inclined arrow in FIG. 1 and is adapted to convey shredded material from the chamber.

Figures 4, 5:
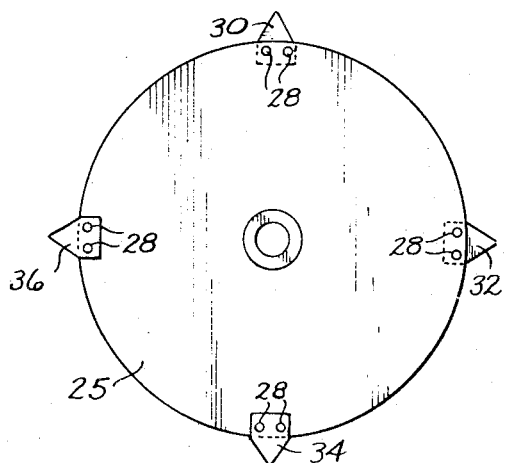
FIG. 4 is a side view of a cutting disk removed from the machine.
FIG. 5 is an front elevation of the cutting disk illustrated in FIG. 4.

The shredding of a bale is accomplished by a cutter organization including cutter means indicated generally at 22 and a retainer assembly indicated generally at 24. The cutter means comprises a plurality of disks 25, also referred to herein as cutter teeth supports, mounted in spaced relation to each other on a shaft 26 which is driven in a counterclockwise direction, as shown by the arrow in FIG. 1, by suitable drive mechanism (not shown). Each disk is constructed substantially as shown in FIGS. 4 and 5. Referring now to FIGS. 4 and 5, it will be seen that adjacent the periphery of each disk, there are mounted, as by bolts 28, triangularly shaped cutting teeth 30, 32, 34, 36, which are evenly spaced around the periphery of the disk at 90° to each other.

As is best seen in FIG. 5, cutter teeth 30, 34 are mounted on opposite axially facing sides of the disk and each has a spacer block 40 interposed between itself and its respective side of the disk. Cutter teeth 32, 36 are also secured to opposite axially facing sides of the disk and each has interposed between itself and its respective side of the cutter disk a spacer block 42. Blocks 42 are thicker than blocks 40, and thus cutter tooth 32 is spaced farther from the right side of this disk than is cutter 30 in FIG. 5, while cutter tooth 36 is spaced farther from the left side of the disk than is cutter tooth 34. With the cutter teeth on a side of the disk spaced at various distances from that side of the disk, multiple cutting paths are defined by the cutting teeth on that side of the disk on rotation of the disk. With multiple cutting paths thus defined adjacent each side of the disk more effective shredding of a bale is accomplished.

Referring again to FIGS. 1 and 2, it will be seen that the diameters of disks 25 decrease on progressing toward the center of the machine from each end of shaft 26 so that their outer edges form a substantially V-shaped profile. It will also be noted that the cutter teeth on each disk are offset with respect to the cutter on the adjacent disk. This cutter design is disclosed in the above-mentioned U.S. Pat. application, Ser. No. 681,307, and its advantages are described more fully therein.

On operation of the apparatus described thus far, the infeed conveyor chain transports a bale into the chamber, shaft 26 is rotated in a counterclockwise direction as seen in FIG. 1, and the cutter teeth move upwardly in an arc to engage the downstream face of the bale to shred it. Shredded material is carried over the tops of the disks by the cutter teeth and is deposited on outfeed conveyor 20 which removes it from the chamber.

Retainer assembly 24, is provided for holding a bale down during the shredding operation and for providing greater shredding action. The retainer assembly includes a pair of elongated, parallel and laterally spaced-apart arms 48, 50 positioned adjacent opposite sides of the housing, and a shaft 52 which extends transversely through the housing adjacent its right end in FIGS. 1 and 2. The right ends of arms 48, 50 are journaled on shaft 52 for swinging about the horizontal axis of the shaft. A bar 54 extends between and interconnects the left ends of arms 48, 50. A plurality of substantially parallel and laterally spaced-apart elongated fingers 56 are secured at one set of ends to bar 54 and project to the left, in a downstream direction in the machine, in FIGS. 1 and 2 toward the cutter disks. Fingers 56 vary in length to conform to the varying diameters of disks 25 so that the longest fingers are at the center of the chamber and face the inner disks. A threaded rod 60 extends through fingers 56 in a region intermediate their ends. A series of nuts 62 screwed onto rod 60 and snugged tightly against opposite sides of the fingers maintain desired spacing between the fingers.

As is best seen in FIG. 1, the retainer assembly is positioned so that the under surfaces of fingers 56 are substantially horizontal and, on being pressed downwardly, are adapted to bear against a substantial portion of the top of a bale in the chamber. The retainer assembly as shown in FIG. 1 is in a cutting position wherein fingers 56 are so disposed that the cutter teeth will pass therebetween on disks 25 being rotated. The fingers thus define a first cutting grate through which the cutter teeth may pass during a shredding operation.

The retainer assembly is connected to housing 12 by adjustment means indicated generally at 70. The adjustment means includes a pair of mounting plates 74 secured, as by bolts 76, to opposed side walls of the housing adjacent the right end of the housing in FIGS. 1 and 2. A slot, or channel, 82 is defined through each of mounting plates 74 with the slot extending at a slight angle from the vertical. Opposite end portions of shaft 52 are slidably received in slots 82 in the mounting plates adjacent opposite sides of housing 12.

An upper portion of each of mounting plates 74 projects above the top of housing 12 and opposite end portions of a shaft 84 which extends across the top of the housing are journaled in these upwardly projecting portions. Secured to the opposite ends of shaft 84 are a pair of disks 87, 88. As is best seen in FIG. 1, disk 88 which is nearest the viewer has a series of spaced-apart notches 89 defined in a lower segment of its periphery. A handle or control lever 90 is secured to and projects upwardly from at least one of the disks, and in this case is shown secured to disk 88. Shaft 84, disks 87, 88, and lever 90 are referred to herein collectively as control means.

Figure 7:
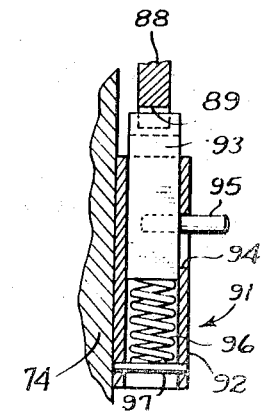
FIG. 7 is a cross-sectional view taken generally along the line 7–7 in FIG. 1.

Mounted on mounting plate 74 nearest the viewer in FIG. 1 is a locking means indicated generally at 91 for locking disk 88 and lever arm 90 into any selected one of several positions. Referring now to FIG. 7, it will be seen that the locking means comprises an elongated square tube 92 secured, as by welding, to mounting plate 74 in a substantially vertical position with an elongated bar 93 having a substantially square cross section slidably received therein. An elongated slot 94 extends through the outwardly facing side of tube 92 and a pin 95 secured to bar 93 projects outwardly through the slot to provide a hand grip for moving the bar longitudinally in the tube. A compression spring 96 is situated within the tube with one of its ends bearing against the lower end of bar 93 and its other end held in place within the tube by a pin 97 which extends transversely through the tube adjacent its lower end. The bar acts as a detent, or catch, and is urged upwardly by the spring into one of the detent-receiving notches 89 in the periphery of disk 88.

Journaled on each of disks 87, 88 adjacent its upstream, or right, edge in FIGS. 1 and 2 is a linking arm 98. A lower end portion of each arm 98 is threaded and extends through a bore in an end portion of shaft 52. A pair of nuts 99 are screwed onto the lower end portion of each arm 98, on either side of shaft 52 and thus connect the control means to opposite sides of the retainer assembly so that movement of lever 90 to the right in FIG. 1 lowers the right end of the retainer assembly and moving lever 90 to the left raises it. The nuts 99 also provide for adjustment of the vertical positioning of shaft 52, and thereby the right ends of arms 48, 50, relative to the control means and relative to and independently of the other end of the retainer assembly. This threaded portion of the linking arm and nuts 99 are also referred to herein as infinitely adjustable means.

Another linking arm means, at one side of the machine only, indicated generally at 100, in FIG. 1, connects the control means to the forward end of the retainer assembly for controlling the vertical positioning of this end of the assembly. Linking arm means 100 comprises a first elongated arm organization indicated generally at 101, which is pivotally connected at its right end to disk 88 and at its left end to a crank 102. Crank 102 is rigidly secured to a shaft 104, seen only in end view in FIG. 1, which extends laterally inwardly through the side of the housing toward the longitudinal center line of the housing. Another crank 106 is secured to and projects normally outwardly from shaft 104 at about the center of the chamber. The upper end of a substantially vertical connecting arm 108 is pivotally connected to the end of crank 106 remote from shaft 104, and is rotatably connected adjacent its lower end to a pair of upwardly projecting ears 112 which are secured to the center one of fingers 56.

With separate linking arm means connecting lever 90 to opposite ends of the retainer assembly as previously described, movement of the lever to the right in FIG. 1 will cause both ends of the retainer assembly to move downwardly translationally to position the retainer assembly so that it will be adapted to press against the upper surfaces of smaller bales, and, conversely, when lever 90 is moved to the left in FIG. 1, both ends of the retainer assembly are moved upwardly translationally to accommodate larger bales. With the retainer assembly thus being moved translationally throughout its vertical adjustment the under surface of fingers 56 remain more or less horizontal and press against substantial portions of the upper surface of a bale in the chamber.

As best seen in FIG. 1, the left ends of fingers 56 are positioned adjacent the cutters, above and upstream from the central axis of shaft 26 about which the cutters rotate. It is desirable to maintain fingers 56 at a substantially constant radial distance from the axis of the shaft throughout vertical adjustment of the retainer assembly. This function is provided by slots 82 in mounting plates 74 on opposite sides of the housing. Explaining further, as the retainer assembly is moved downwardly the slope of slots 82, in which the ends of shaft 52 of the retainer assembly are slidably received, cause the retainer assembly to shift somewhat to the right, or in an upstream direction, and, conversely, when the retainer assembly is moved upwardly the slots cause the retainer assembly to move to the left, in a downstream direction. In this manner the radial distance between the axis of shaft 26 and the downstream ends of fingers 56 remains substantially constant.

Referring again to FIG. 1 and the arm organization indicated generally at 101, it will be seen that this organization comprises an elongated tubular member 126 which is pivotally connected at its right end to disk 88 and has a nut 128 secured, as by welding, to its left end. A threaded rod 130 is screwed into nut 128 and extends a short distance into tubular member 126. A jam nut 132 is screwed onto rod 130 outwardly from nut 128 and when tightened against nut 128 acts to lock threaded rod 130 in position relative to member 126.

Figure 6:
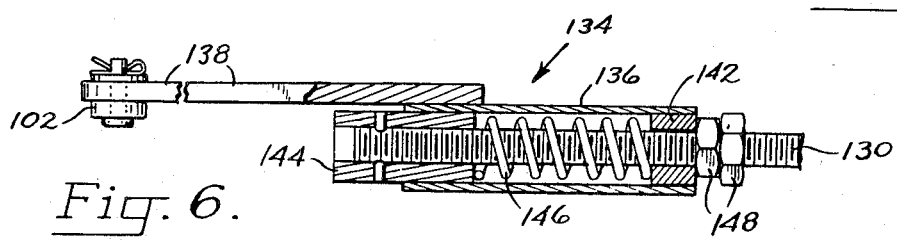
FIG. 6 is a cross-sectional view taken generally along the line 6–6 in FIG. 1.

A yieldable connector indicated generally at 134 is interposed between and connects rod 130 to crank arm 102. Referring now to FIG. 6, in which yieldable connector 134 is illustrated in greater detail, it will be seen that the connector comprises a tube 136, through which the end of threaded rod 130 remote from tubular member 126 extends, and an elongated bar 138 secured to a side of tube 136 and extending longitudinally outwardly therefrom. Bar 138, in turn, is pivotally connected to crank arm 102.

A collar 142 is secured within the right end of tube 136 and has a bore therethrough which slidably receives rod 130. A nut 144 having a cylindrical outer surface is screwed onto the end of rod 130 and is slidably received within tube 136. A compression spring 146 is interposed between and, at its opposite ends, bears against collar 142 and nut 144 to act as a biasing means urging tube 136 and bar 138 to move to the right relative to rod 130. A pair of jam nuts 148 screwed onto rod 130 outwardly of collar 142 act as limit means to limit the movement of tube 136 to the right.

Yieldable connector 134 acts through the cranks, shaft, and arms of linkage means 100 to bias fingers 56 downwardly against the top of a bale. The yieldable connector also permits the retainer assembly to move upwardly and away from the top of a bale when a predetermined pressure is applied against the under surface of the fingers. This upward movement is important in that it permits the retainer assembly to move upwardly to move fingers 56 out of the path of the cutter teeth on disks 25 should a solid foreign object, such as a rock, which is too large to pass between fingers 56 be carried upwardly from the bale by the cutter teeth. Thus, rather than jamming between the fingers and the cutter teeth, such foreign object is permitted to lift the fingers and retainer assembly and, as it passes the retainer assembly, drops downwardly in the machine between disks 25 (which are more widely spaced than fingers 56) to pass from the machine.

Figure 3:
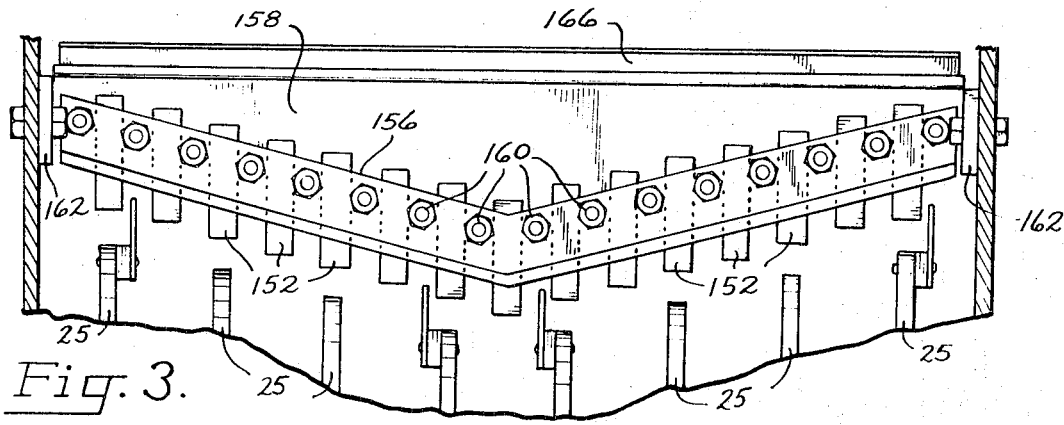
FIG. 3 is a view taken generally along the line 3–3 in FIG. 1.

Referring now to FIGS. 1 and 3, secured to the side walls of the housing and extending transversely of the chamber above disks 25 is a series of elongated substantially parallel, laterally spaced-apart, vertical bars 152 which also form part of the cutter organization in the machine. Bars 152 define a second cutting grate through which the cutter teeth may pass after passing through the first cutting grate defined by fingers 56. Bars 152 are mounted in the machinery be being sandwiched between a forward angle member 156 and a rear angle member 158. A series of bolts 160 extend through angle members 156, 158, between bars 152, with nuts tightened thereon to clamp the bars between the angle members. A pair of plates 162 are secured, as by welding, to opposite ends of angle member 158 and these, in turn, are secured to opposing side walls of housing 12 by a series of nuts and bolts.

A deflector 166, in the form of a rectangular piece of sheet metal, is hinged adjacent one of its edges to the upper surface of retainer assembly 46 and extends at an angle upwardly and forwardly through the chamber to rest, adjacent an edge opposite its hinged edge, atop angle member 158. Shield 166 maintains shredded material in a desired cutting path as it is carried by the cutters between fingers 56 and bars 152.

A tubular conduit 170, seen in cross section in FIG. 1 only, may be mounted atop fingers 56 extending transversely of the chamber. The conduit is adapted to have liquid, such as water, supplied thereto under pressure and orifices spaced along the lower surface of the conduit allow a fine spray of the liquid to be directed onto the material as it is shredded to keep down dust in the operation of the machine.

It is often desired to add molasses, or other such liquids, to the shredded feed to increase the nourishment value of the feed. For this reason, another tubular conduit 172, also seen only in cross section in FIG. 1, is provided which extends transversely of the chamber in a region downstream, or to the left, of bars 152. This conduit is adapted to have a liquid, such as molasses, supplied thereto under pressure. Orifices in the lower surface of conduit 172 permit such liquid to flow onto the shredded material before it is conveyed out of the machine. The shredded material in this region is being moved turbulently and this will cause the liquid to be mixed thoroughly with the shredded material.

The operation of the machine should be fairly obvious from the above description. Adjustment means 70 is first adjusted to place the retainer assembly 46 in its proper position to bear against the upper surfaces of bales which will be fed into the machine and locking means 91 locks the adjustment means and retainer assembly in such position. A bale is fed into the machine by being transported by conveyor 14 until it passes under retainer assembly 46 which presses against its top. Further movement of the bale in a downstream direction brings its downstream face into engagement with the cutter teeth on disks 25 which, when rotated, bite into the downstream face of the bale.

As the teeth bite into the bale, the material in the bale is shredded and is carried upwardly through the cutting grate provided by fingers 56 wherein a shearing, or cutting, action takes place. The material is then carried further by the cutter teeth and passes through the grate provided by bars 52 wherein a second shearing, or cutting, action is effected to assure a fine cutting of the material. As the material is carried by the teeth beyond bars 152 it is passed onto conveyor 20 which moves it out of the machine.

When a solid foreign object of such size that it will not pass between cutting fingers 56 has been embedded in the bale and is carried upwardly by the cutter teeth against fingers 56, yieldable connector 134 permits the forward end of the retainer assembly and fingers 56 to move upwardly out of their cutting position and allows the foreign object to pass by the fingers. There should then be sufficient space between disks 25 for the foreign object to drop therebetween and out of the cutter organization. An opening in the floor of the machinery (not shown) permits the foreign object to fall from the machinery. When fingers 56 are moved out of their cutting position, cutting action is still provided by bars 152 so that the material will be adequately shredded.

In order to shred bales of different sizes, it is a simple operation to vary the vertical position of the retainer assembly. The operator need merely unlock locking means 91 and either move lever 90 to the left in FIG. 1 to accommodate larger bales or move it to the right to accommodate smaller bales. Once the retainer assembly is properly positioned the locking means is reengaged with the control means.

I claim:

1. In a machine for shredding baled material including a housing defining a chamber for receiving a bale and transport means for transporting a bale into the chamber along a path in a downstream direction in the machine, a cutter organization comprising cutting means in the chamber, an elongated retainer assembly adapted to engage a top portion of a bale during shredding with one end of the retainer assembly adjacent the cutting means, and adjustment means operatively connecting said retainer assembly to said housing for adjusting the vertical position of said retainer assembly to accommodate bales of various sizes, said adjustment means comprising control means mounted for movement relative to said housing and linkage means interconnecting said retainer assembly and said control means in such a manner that movement of said control means causes the retainer assembly to be moved in a translationally vertical path so that the retainer assembly may be maintained in substantially the same slope relative to the path for a bale regardless of the adjustment of the retainer assembly.

2. The machine of claim 1, wherein said control means comprises a movable lever and said linkage means comprises first and second linking arm means connecting said lever to said retainer assembly with said first linking arm means being connected to the retainer assembly for controlling movement of its said one end on movement of the lever and said second linking arm means being connected to the retainer assembly for controlling movement of its other end on movement of the lever.

3. The machine of claim 2, wherein said first linking arm means comprises yieldable connector means adapted yieldably to hold the retainer assembly against the top of a bale and to permit said one end of the assembly to move upwardly free of the top of such bale when a predetermined pressure is applied to the assembly.

4. The machine of claim 2, wherein said retainer assembly has substantial lateral width and one of said linking arm means comprises a pair of laterally spaced-apart connecting arms which operatively connect said lever to opposite sides of said retainer assembly.

5. The machine of claim 3, wherein said first linking arm means comprises a first arm member which is connected to said lever and a second arm member which is connected adjacent one of its ends to said retainer assembly and adjacent its other end to said first arm member for movement relative thereto, with movement of said second arm in one direction causing the one end of the retainer assembly to move downwardly, and said yieldable connector means comprises biasing means interposed between said first and second arm members in such a manner as to urge the second arm member to move in said one direction relative to the first arm member.

6. The machine of claim 1, wherein said cutting means comprises cutter teeth rotatable about an axis extending transversely of the housing, said one end of the retainer assembly is disposed above and upstream from said axis, and said adjustment means further comprises guide means adapted to cause the retainer assembly to shift in an upstream direction when it is lowered and to shift in a downstream direction when it is raised whereby said one end of the retainer assembly is maintained at a substantially constant radial distance from the axis of the cutter upon adjustment of the retainer assembly.

7. The machine of claim 6, wherein said guide means comprises means defining a channel which slidably receives a portion of said retainer assembly with said channel sloping away from the axis of the cutter on progressing downwardly.

8. The machine of claim 2, which further comprises infinitely adjustable means interposed between said lever and one of said linking arm means for adjusting the vertical position of one of said ends of the retainer assembly independently of and relative to the other of said ends.

9. The machine of claim 1, wherein said cutting means comprises a plurality of laterally spaced-apart cutter teeth rotatable about an axis extending transversely of said chamber, said retainer assembly comprises a plurality of substantially parallel elongated laterally spaced-apart fingers which project toward said cutting means from said one end of the retainer assembly to define a first cutting grate through which the cutter teeth may pass on rotation about said axis, and wherein said cutter organization further comprises a series of elongated substantially parallel laterally spaced-apart bars secured to said housing and projecting toward said cutting means to define a second cutting grate through which said cutter teeth may pass on rotation subsequent to passing through said first cutting grate.

10. The machine of claim 9, wherein said adjustment means further comprises yieldable connector means adapted yieldably to hold the assembly in a cutting position in which said fingers are so positioned that the cutter teeth may pass therebetween on rotation about said axis and to permit the assembly to move upwardly to move the fingers out of said cutting position when a predetermined pressure is applied against the fingers.

11. The machine of claim 1, wherein said cutting means comprises a cutter tooth support rotatable about an axis extending transversely of said housing and at least a pair of cutter teeth mounted on one side of said support which faces in an axial direction, with one of said cutter teeth spaced farther from said one side of the support than is the other of said teeth, thus to define multiple cutting paths on said one side of the cutter tooth support on rotation about said axis.

12. The machine of claim 11, wherein said cutter tooth support comprises a disk mounted on and extending radially outwardly from a rotatable shaft which shaft extends transversely of said housing, said cutter teeth are removably secured to an axially facing side of said disk by releasable fasteners, and spacer blocks having different thicknesses are interposed between said disks and said teeth to produce the different spacings of the cutter teeth from said one side of the disk.